No. 821,473. PATENTED MAY 22, 1906.
J. S. DIKEMAN.
AUTOMATIC CHAIN FEED DRILLING ATTACHMENT.
APPLICATION FILED SEPT. 9, 1905.

WITNESSES
H. H. Lamb.
S. W. Atherton.

INVENTOR
Joseph S. Dikeman
BY
A. M. Wooster
ATTORNEY

No. 821,473. PATENTED MAY 22, 1906.
J. S. DIKEMAN.
AUTOMATIC CHAIN FEED DRILLING ATTACHMENT.
APPLICATION FILED SEPT. 9, 1905.
2 SHEETS—SHEET 2.
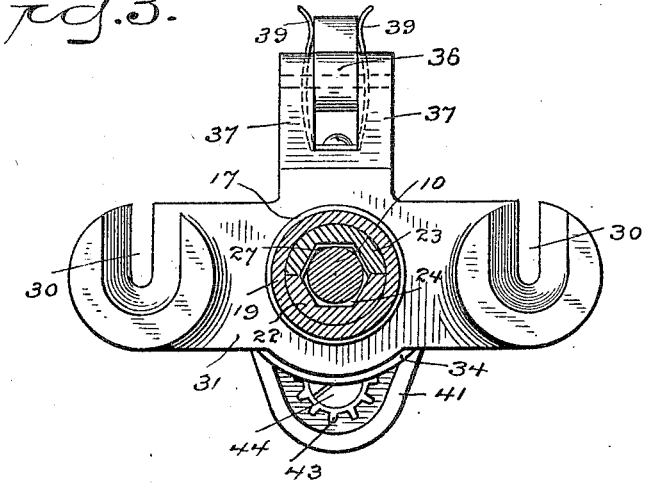
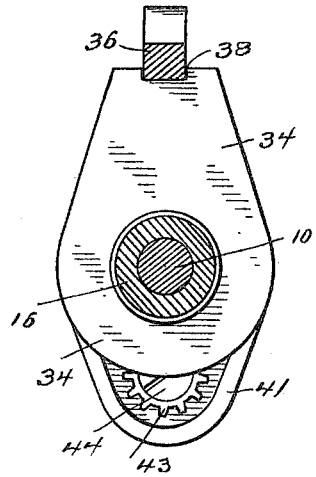
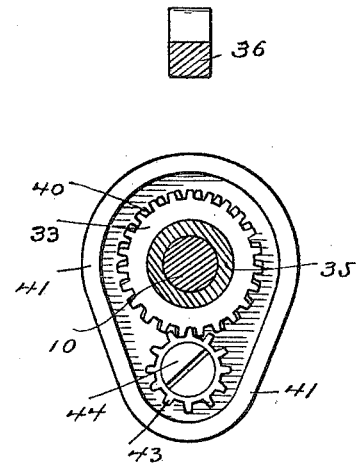
WITNESSES
H. A. Lamb.
S. W. Atherton.
INVENTOR
Joseph S. Dikeman
BY
A. M. Wooster
ATTORNEY

UNITED STATES PATENT OFFICE.

JOSEPH S. DIKEMAN, OF TORRINGTON, CONNECTICUT.

AUTOMATIC CHAIN-FEED DRILLING ATTACHMENT.

No. 821,473.  Specification of Letters Patent.  Patented May 22, 1906.

Application filed September 9, 1905. Serial No. 277,697.

*To all whom it may concern:*

Be it known that I, JOSEPH S. DIKEMAN, a citizen of the United States, residing at Torrington, county of Litchfield, State of Connecticut, have invented a new and useful Automatic Chain-Feed Drilling Attachment, of which the following is a specification.

This invention relates to the general construction and mode of operation of chain-feed drilling attachments, and has for its general object to simplify and cheapen their construction and to greatly improve their mode of operation in use.

A further object of the invention is to provide an attachment of the character described having an automatic feed produced by a relatively fixed gear, a feeding-gear concentric therewith, and a pinion which travels about said gears and produces slight rotary movement of the feeding-gear.

With these and other objects in view I have devised the simple structure which I will now describe, referring to the accompanying drawings, forming a part of this specification, and using reference characters to indicate the several parts.

Figure 1 is a plan view illustrating my novel drilling attachment as in use; Fig. 2, a longitudinal section, on an enlarged scale, on the line 2 2 in Fig. 1; Fig. 3, a cross-section of the chuck on the line 3 3 in Fig. 2 looking toward the right, the cross-piece being in elevation; Fig. 4, a cross-section of the shank and threaded sleeve on the line 4 4 in Fig. 2 looking toward the right, the gear-plate appearing in elevation; and Fig. 5 is a cross-section of the shank, sleeve, and fixed gear on the line 5 5 in Fig. 2 looking toward the right, the gear-case appearing in elevation.

10 denotes the shank, which is provided at one end with a tang 11, adapted to engage any suitable chuck, as 12, which may be the chuck of an ordinary brace or any suitable device for rotating the shank. At the other end of the shank is a chuck 13, which may be secured to the shank in any suitable manner, as by a cross-pin 14, which is adapted to receive the shank of a drill 15.

16 denotes an externally-threaded sleeve through which the shank passes longitudinally and loosely. Between the inner end of chuck 13 and the forward end of the sleeve is a ball-bearing comprising a ball-cup 17, through which the shank passes loosely and which carries balls 18, upon which the inner end of the chuck bears.

19 denotes the barrel of the chuck, which is internally threaded at its outer end for engagement by a nut 20, having an opening 21, through which the drill passes. Within the barrel are inner and outer sleeves 22 and 23, lying end to end, each of which is provided with an opening 24, preferably made angular, through which the drill passes. The inner end of the inner sleeve bears against the inner end of the barrel and is held against rotation by means of a pin 25, which projects from the wall of the barrel and engages a slot in the sleeve. The forward end of the inner sleeve is provided with an incline 27, which is engaged by a corresponding incline upon the inner end of the outer sleeve. The outer end of the outer sleeve is engaged by the inner end of the nut. When the nut is turned inward, the outer sleeve will be forced against the inner sleeve, and through the engagement of the inclines the sleeves will be moved laterally in opposite directions, causing opposite inner sides of the sleeves, preferably made angular, to grip the shank of the drill firmly and lock it in the chuck, as clearly shown in Fig. 2.

28 indicates a piece of work which is being operated upon by the drill and is shown as held in place by a chain 29, the ends of which engage recesses 30 in a nut or cross-piece 31, having a threaded central opening 32 to receive the threaded sleeve. In use the chain is passed around the work and the ends of the chain are engaged in the recesses in the nut or cross-piece, the cross-piece being rotated on the sleeve to place it in the desired position relatively to the work.

The feed of the drill is produced by mechanism which I will now describe.

33 denotes a gear rigidly secured to a gear-plate 34, which is loose on the reduced end 35 of the threaded sleeve. Plate 34 and gear 33, which I will term for convenience the "fixed" gear, may be locked against rotation on the reduced end of the sleeve by means of a latch 36, pivoted between arms 37, which extend from the nut or cross-piece, said latch being adapted to engage a locking-notch 38 in the gear-plate with a sliding engagement.

39 denotes springs secured to the cross-piece between which the latch is passed and which retain it removably in engagement with the locking-notch in the gear-plate.

40 denotes a gear at one side of and concentric with fixed gear 33, which I will term for convenience the "feeding-gear" and which is keyed or otherwise rigidly secured to the reduced end of the threaded sleeve.

41 denotes a gear-case, which is rigidly secured to shank 10, as by means of a pin 42. This case incloses the fixed and feeding gears and also carries a pinion 43, journaled on a stud 44 within the gear-case and meshing with both of the gears.

The peculiarity of construction is that the fixed and feeding gears although both mesh with the pinion have a variant number of teeth. In the present instance the feeding-gear is shown as having twenty-three teeth and the fixed-gear is shown as having twenty-two teeth, so that each rotation of the pinion about said gears will impart one twenty-third of a rotation to the feeding-gear.

The operation is as follows: Having locked the drill in the chuck and placed the attachment in position relatively to the work and placed the chain about the work and connected the ends to the nut or cross-piece the operator rotates the shank and with it the drill by means of a brace or any convenient rotating device. As the gear-case is fixed to the shank it rotates with it, pinion 43 engaging the fixed gear and traveling around it and also engaging the feeding-gear, which is keyed to the threaded sleeve. Owing to the fact that the feeding-gear has one more tooth than the fixed gear—for example, twenty-three to twenty-two—it follows that the rotation of the pinion about the fixed gear will impart slight rotary movement to the feeding-gear and threaded sleeve to which the latter is keyed. In the present instance the feeding-gear and sleeve will make a complete rotation during each twenty-three rotations of the pinion about the fixed gear, and the threaded sleeve will consequently be fed forward a distance equal to the width of a thread of the sleeve and through the engagement of the forward end of the sleeve with the inner end of the chuck (a ball-bearing being interposed in the present instance) will feed the drill forward that distance or one twenty-third of the width of a thread during each rotation of the shank and drill. The latch 36 prevents the gear-plate from rotating when in the position shown in Figs. 1 and 2 and yet permits the gear-plate to advance toward the nut or cross-piece as the drill enters the work; but if it be desired to quickly change the distance between the nut and gear-plate, as when withdrawing the drill from the work, or placing the drill in position to continue the drilling of a partially-formed hole, or when the chain is to be shortened up and the nut consequently shifted farther from the gear-plate, then the latch is simply disengaged from the notch in the gear-plate, so as to unlock or disconnect the gear-plate and permit the nut or cross-piece to be rapidly adjusted along the screw-sleeve 16 without actuating the compound gear. In other words, when the means which in use prevent relative rotation of the nut and gear-plate are unlocked or disconnected a rapid change can be made in the relative positions of the nut and drill, because the drill, sleeve 16, gear-plate 34, and the compound gears can all be rotated as a whole through the nut in either direction.

Having thus described my invention, I claim—

1. In a device of the character described the combination with a drill-carrying shank and an externally-threaded sleeve through which the shank passes loosely, of a nut on said sleeve having means for connecting it with the work to be drilled, a relatively fixed gear through which the sleeve passes loosely, a feeding-gear concentric with the fixed gear and secured to the sleeve, said feeding-gear having one tooth more than the fixed gear, a pinion carried by the shank and engaging both the fixed gear and the feeding-gear, whereby the rotation of said pinion about the gears will impart slight rotary movement to the feeding-gear and will feed the sleeve forward, and disconnectible means between the nut and the relatively fixed gear for preventing rotation of the one relatively to the other.

2. In a device of the character described the combination with a drill-carrying shank and an externally-threaded sleeve through which the shank passes loosely and which is provided with a reduced end, of a nut on said sleeve having means for connecting it with the work to be drilled, a gear carried by a plate loose on the reduced end of the sleeve, disconnectible means between the nut and the gear-plate for locking said plate and gear against rotation, a feeding-gear concentric with the other gear and secured to the sleeve, said feeding-gear having one more tooth than the other gear, and a pinion carried by the shank and engaging both of said gears, substantially as described, for the purpose specified.

3. In a device of the character described the combination with a drill-carrying shank, an externally-threaded sleeve through which the shank passes loosely and which is provided with a reduced end and a cross-piece having a threaded opening through which the sleeve passes, of a gear carried by a plate loose on the reduced end of the sleeve, a movable latch carried by the cross-piece and adapted to lock the plate and gear against rotation, or to unlock them, a feeding-gear concentric with the other gear and secured to the sleeve, said feeding-gear having one more tooth than the other gear, and a pinion carried by the shank and engaging both of said gears, substantially as described, for the purpose specified.

4. In a device of the character described the combination with a drill-carrying shank, an externally-threaded sleeve through which the shank passes loosely and which is provided with a reduced end and a cross-piece having a threaded opening through which the sleeve passes, of a gear carried by a plate loose on the reduced end of the sleeve, a movable latch carried by the cross-piece and adapted to lock the plate and gear against rotation, or to unlock them, a spring for retaining the latch in the locking position, a feeding-gear concentric with the other gear and secured to the sleeve, said feeding-gear having one more tooth than the other gear, and a pinion carried by the shank and adapted to travel about the locked gear and the feeding-gear whereby rotary movement is imparted to the feeding-gear, substantially as described, for the purpose specified.

5. In a device of the character described the combination with a drill-carrying shank, an externally-threaded sleeve through which the shank passes loosely and which is provided with a reduced end and a cross-piece having a threaded opening through which the sleeve passes, of a plate through which the reduced end of the sleeve passes loosely and which is provided with a locking-notch, a gear carried by said plate, a latch carried by the cross-piece and having sliding engagement with the locking-notch to lock the plate and gear against rotation, a feeding-gear concentric with the gear on the plate and secured to the sleeve, said feeding-gear having one more tooth than the other gear, and a pinion carried by the shank and engaging both of said gears, substantially as described, for the purpose specified.

6. In a device of the character described the combination with a drill-carrying shank, an externally-threaded sleeve through which the shank passes loosely and which is provided with a reduced end and a cross-piece having a threaded opening through which the sleeve passes, of a gear carried by a plate loose on the reduced end of the sleeve, a latch carried by the cross-piece and adapted to lock the plate and gear against rotation, a feeding-gear concentric with the other gear and secured to the sleeve, said feeding-gear having one more tooth than the other gear, a gear-case carried by the shank and inclosing said gears and a pinion carried by the gear-case and engaging said gears, rotation of the pinion about the gears acting to impart a feeding rotation to the feeding-gear.

In testimony whereof I affix my signature in presence of two witnesses.

JOSEPH S. DIKEMAN.

Witnesses:
BERNARD E. HIGGINS,
W. H. MORRISON.